United States Patent [19]
Lee et al.

[11] Patent Number: 6,081,554
[45] Date of Patent: Jun. 27, 2000

[54] METHOD TO CONTROL THE GENERATED BIT RATE IN MPEG-4 SHAPE CODING

[75] Inventors: Jae-Boom Lee; Alexandros Eleftheriadis, both of New York, N.Y.

[73] Assignee: The Trustees of Columbia University in the City of New York, New York, N.Y.

[21] Appl. No.: 09/166,212

[22] Filed: Oct. 2, 1998

[51] Int. Cl.$^7$ .............................. H04N 7/12; H04N 11/02; H04N 11/04

[52] U.S. Cl. .......................... 375/240; 348/419; 348/421; 382/239; 382/243

[58] Field of Search ................................... 348/390, 404, 348/405, 419, 420, 421; 382/239, 243; H04N 7/12, 11/02, 11/04

[56] References Cited

U.S. PATENT DOCUMENTS

| | | | |
|---|---|---|---|
| 5,500,673 | 3/1996 | Zhou | 348/156 |
| 5,548,322 | 8/1996 | Zhou | 348/14 |
| 5,550,581 | 8/1996 | Zhou | 348/17 |
| 5,596,352 | 1/1997 | Zhou | 348/14 |
| 5,852,669 | 12/1998 | Eleftheriadis et al. | 348/405 |
| 5,959,672 | 9/1999 | Sasaki | 348/390 |

OTHER PUBLICATIONS

A. Ortega—Ph.D. Thesis, Columbia University; pp. 31–55.

"MPEG–4 Video Verification Model: A video encoding/decoding algorithm based on content representation" by T. Ebrahimi; Signal Processing Laboratory, Swiss Federal Institute of Technology; Lausanne, Switzerland; pp. 367–384.

"MPEG–4 Video Verification Model (VM 10.0)"; pp. 20–35.

"ITU Standardisation of Very Low Bitrate Video Coding Algorithms" by K. Rijkse; PTT Research, The Netherlands; Signal Processing: Image Communciation 7 (1995) pp. 553–565.

"Optimal Trellis–Based Buffered Compression and Fast Approximations" by Ortega et al; IEEE Transations on Image Processing, vol. 3, No. 1, Jan. 1994; pp. 26–40.

"Optimal Shape Coding Under Buffer Constraints" by Lee et al; Department of Electrical Engineering and Columbia New Media Technology Center, Columbia University New York; (IEEE–ICIP98).

*Primary Examiner*—Howard Britton
*Assistant Examiner*—Nhon T Diep
*Attorney, Agent, or Firm*—Baker Botts L.L.P.

[57] ABSTRACT

In a digital video compression system that includes both a real buffer of size $B_{max}$, and a smaller virtual buffer of size $B_{virtual}$, a method for controlling the generated bit rate of compressed video information to keep within the maximum buffer capacity is disclosed. The method includes the steps of (a) receiving blocks of digital information, (b) determining whether a current block can be compressed by one of one or more shortcuts and using the shortcut if possible; (c) if the current block cannot be compressed with any shortcut, determining whether the virtual buffer capacity will be exceeded if the current received block is compressed only by arithmetic coding and using only arithmetic coding if possible; (d) if the current block cannot be compressed with any shortcut and the virtual buffer capacity would be exceeded with only arithmetic coding, determining whether the virtual buffer capacity will be exceeded if the current block is compressed with both downsampling and arithmetic coding and using both downsampling and arithmetic coding if possible; and (e) if all else fails, compressing the current block with a default mode of compression even if the virtual buffer capacity is exceeded with such compression.

20 Claims, 12 Drawing Sheets

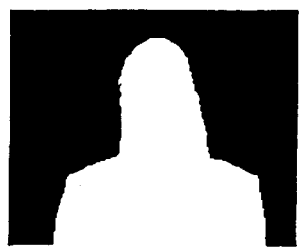
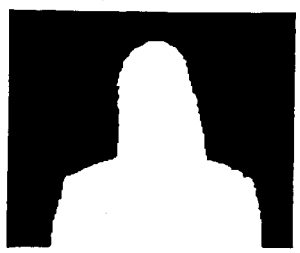
FIG. 10a    FIG. 10b    FIG. 10c
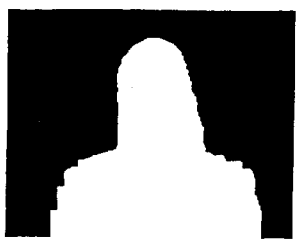
FIG. 10d    FIG. 10e    FIG. 10f
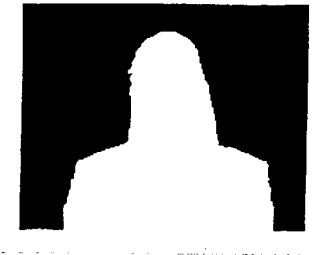
FIG. 11a    FIG. 11b    FIG. 11c
FIG. 11d    FIG. 11e    FIG. 11f

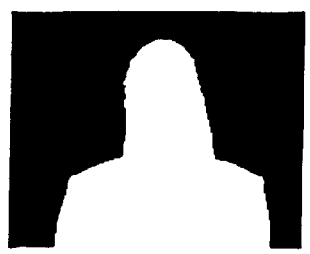
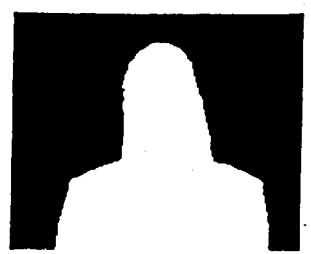
FIG. 12a    FIG. 12b    FIG. 12c
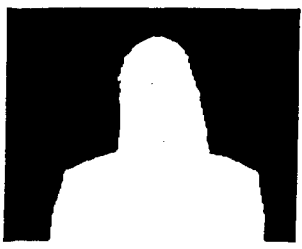
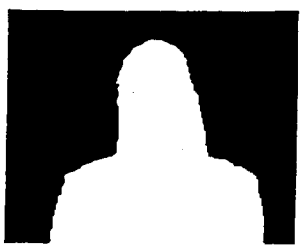
FIG. 12d    FIG 12e    FIG. 12f
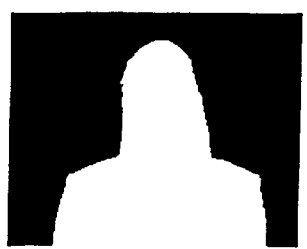
FIG. 13a    FIG. 13b    FIG. 13c
FIG. 13d    FIG. 13e    FIG. 13f

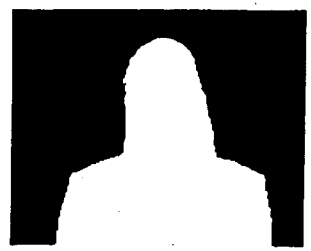  
FIG. 14a        FIG. 14b        FIG. 14c
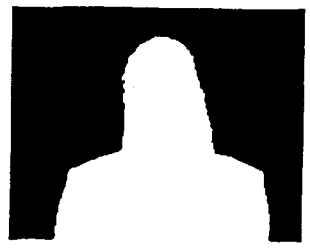 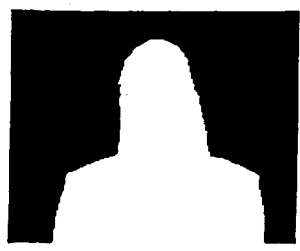 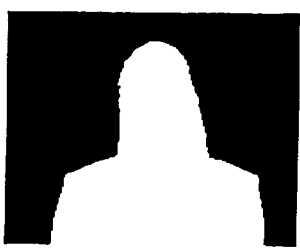
FIG. 14d        FIG. 14e        FIG. 14f
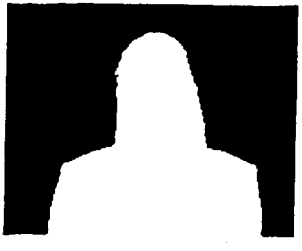 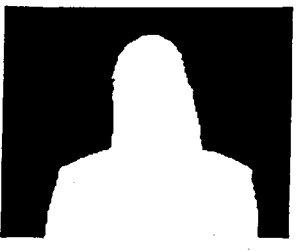 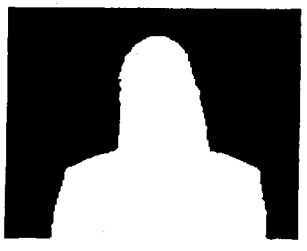
FIG. 15a        FIG. 15b        FIG. 15c
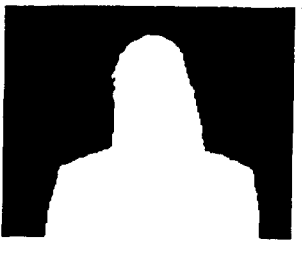  
FIG. 15d        FIG. 15e        FIG. 15f

METHOD TO CONTROL THE GENERATED BIT RATE IN MPEG-4 SHAPE CODING

BACKGROUND OF THE INVENTION

I. Field of the Invention

The present invention relates to techniques for compression of object based digital image information, and more specifically, to encoding shape information as part of an MPEG-4 or similar type coding scheme.

II. Description of the Related Art

In recent years, the field of digital video has increasingly focused on object based compression schemes. While existing commercial video compression techniques encode video (and associated audio) information based on pixel or frames, object based compression procedures seek to encode individual video objects, such as persons, faces and other items in a scene, in order to generate a more robust representation of such video information in the compressed domain and to permit both flexibility in scene composition and interactivity with scene content.

In particular, the International Standardization Organization (ISO) has recently adopted the MPEG-4 video compression standard, as described in ISO document ISO/IEC JTC1/SC29/WG11N2201 (May 15, 1998), the disclosure of which is incorporated by reference herein. The MPEG-4 standard specifies the syntax of a compliant bitstream, rather than the actual encoding process or any hardware used in that process, and hence references in the foregoing disclosure to MPEG-4 encoding are made with the understanding that although the specifics of such encoding are open ended, the generated bitstream must be MPEG-4 compliant.

Under the MPEG-4 rubric, the parlance of Video Objects ("VOs") and Video Object Planes ("VOPs") are used to represent encoded information. VOs correspond to independently coded entities that can be accessed and manipulated by a user, e.g., by cut and paste, and which are saved as separate bitstreams. VOPs correspond to instances of a VO at a particular time.

An MPEG-4 video encoder includes two main parts, a so called shape coder and a more traditional texture coder, both of which operate on the same VOPs. While the shape coder defines the outer border of a VO at a particular time, the texture coder encodes color information for pixels within that VO.

Both the texture coder itself and motion estimation circuitry within the MPEG-4 encoder operate similarly to coders and circuitry used in other state-of-the-art standards, such as MPEG-2. However, although the problem of shape representation have been previously investigated in the fields of computer vision, image understanding, image compression and computer graphics, MPEG-4 represents the first standardization effort which mandates the adoption of a shape representation technique in an encoding process.

In MPEG-4, two types of shape data are used in the compression process: grey scale and binary shape information. Binary shape information is set to a constant value within any VOP, so that any pixel within the VOP is assigned one value while pixels outside of the VOP are assigned a different value. The grey scale shape information assigns to each pixel in such a VOP a value from a range of possible values, usually 0 to 255, that represent the degree of transparency of that pixel. Thus, if the binary shape data for pixels within a VOP is set to 255, the grey scale data will represent an offset to 255, with a 0 offset value meaning that the pixel is in full view and increasing offset values meaning that the VO corresponding to the VOP is either fading in or fading out from the scene.

State of the art video compressiontechniques such as MPEG-2 divide frames of video information into macroblocks, which in turn form the basis of the compression algorithm. In MPEG-4 parlance, Binary Alpha Planes of binary shape information are divided into an array of Binary Alpha Blocks ("BABs") 120. Referring to FIG. 1, each BAB 100 is defined as a set of 16×16 binary pixels 110, and is comprised of a 4×4 array of pixel blocks ("PBs") 120, which themselves are 4×4 arrays of pixels 110.

An important step in the MPEG-4 compression process focuses on reducing the data needed to adequately represent shape information. Referring to FIG. 2, current rate control and rate reduction in MPEG-4 is realized through size conversion of the binary alpha information. An original BAB 210 is downsampled at a certain conversion ratio ("CR") value to generate a size compressed BAB 220. The compressed BAB is then upsampled at the same CR value to generate an approximated binary alpha block BAB' 230. The distortion between the original BAB 210 and the approximated binary alpha block BAB' 230 is measured. In this size conversion process, the determination of an acceptable CR is effected based on a given distortion threshold alpha_th. That is, it is necessary to ascertain whether the compression of a certain BAB at a specific size conversion CR yields acceptable quality.

Given the current original BAB and an approximation of the BAB at a particular size conversion value, BAB', an acceptable quality function ACQ may be defined as shown in equation (1):

$$ACQ(BAB')=MIN(acq_1, acq_2, \ldots, acq_{16},) \quad (1)$$

where $$acq_{1,} = \begin{cases} 0, & \text{if } SAD\_PB_i > 16 \times alpha\_th \\ 1, & \text{otherwise} \end{cases}$$

and SAD_PB, (BAB, BAB') is defined as the sum of absolute differences for $PB_i$, where an opaque pixel has the value 255 and a transparent pixel has the value 0. The parameter alpha_th has values $\{0, 16, 32, 64, \ldots, 256\}$. If alpha_th =0 then encoding will be lossless. A value of alpha_th=256 means that the accepted distortion is at a maximum.

In this process, consider the down-sampling case first. For CR=½, if the average pixel value in a 2×2 pixel block is equal to or greater than 128, the pixel value of the down-sampled block is set to 255, otherwise to 0. For CR=¼, if the average pixel value in a 4×4 pixel block is equal to or greater than 128, the pixel value of the down-sampled block is set to 255, otherwise to 0.

Up-sampling is carried out for any BAB having a CR other than 1. The value of an interpolated pixel is determined by examining its neighboring pixels. For the pixel value calculation, the value of "0" is used for a transparent pixel, and "1" for an opaque pixel. Referring to FIG. 3, pixels A, B, C, D, E, F, G, H, I, J, K, L, are each assigned different index values to coefficient $c_k$, and are used in the generation of values of the interpolated pixels at the top-left point (P1) 310, top-right point (P2) 320, bottom-left point (P3) 330, and bottom-right point (P4) 340, as given by equations 2–5:

P1: if($4 \times A + 2 \times (B+C+D) + (E+F+G+H+I+J+K+L) > Th[C_f]$) then '1' else "0". (2)

P2: if(4×B+2×(A+C+D)+(E+F+G+H+I+J+K+L)>Th[$C_f$]) then '1' else "0".  (3)

P3: if(4×C+2×(A+C+D)+(E+F+G+H+I+J+K+L)>Th[$C_f$]) then '1' else "0".  (4)

P4: if(4×D+2×(A+C+D)+(E+F+G+H+I+J+K+L)>Th[$C_f$]) then '1' else "0".  (5)

where the 8-bit filter coefficient, $C_f$, is given by equation (6):

$$C_f = \sum_k c_k \qquad (6)$$

In equations 2–6, representative values of $c_k$ are used for $C_f$, and values of lettered pixel values are used for the interpolated pixels P1, P2, P3 and P4. Note that the two representations imply the same value, e.g., for interpolated pixel P1, the values of F and $c_0$, E and $c_1$, L and $c_2$, K and $c_3$, J and $c_4$, I and $c_5$, H and $c_6$, and G and $c_7$, are all the same values. Based on the calculated $C_f$, the threshold value Th[$C_f$] can be obtained from the look-up table as shown in the MPEG-4 Verification Model Version 8.0, ISO/IEC JTC1/SC29/WG11 (July 1997), as those skilled in the art will appreciate.

Note that after interpolation, the pixels in the low-resolution image, e.g., pixels A–L, are not contained in the upsampled image, i.e., all pixels in the upsampled image are interpolated. When the BAB is on the left and/or top border of the VOP, the left and/or top borders are extended from the outermost pixels inside the BAB. In the case that CR=¼, the BAB is first interpolated into the size corresponding to CR=½, then interpolated into the full size, i.e., representing CR=1. The decision to accept a certain CR value for a specific BAB is based on ACQ(BAB'). If the quality is acceptable, that CR is adopted for that BAB. Once the value of CR is determined, size conversion is effected with that CR value for the BAB.

After the size conversion process of FIG. 2 has been accomplished, each BAB is further compressed according to one of seven different "lossless" modes, which utilize shape motion vectors ("MVs") and a shape motion vector predictors ("MVPs") to perform context-based arithmetic encoding("CAE"). In the listed lossless compression modes, the quantity called motion vector difference of shape ("MVDs") is determined with reference to both MVs and MVPs such that MVDs=MVs-MVPs.

1. MVDs==0 && No Update
2. MVDs!=0 && No Update
3. all_0
4. all_255
5. intraCAE
6. MVDs==0 && interCAE
7. MVDs?=0 && interCAL In intra-coded VOP's ("I-VOPs"), only the coding modes, "all_0", "all_255" and "ntra-CAE" are allowed. MVPs are determined by referring certain candidate MVs and texture motion vectors around the macroblock that corresponds to the current shape block. FIG. 4 illustrates the locations of such candidate macroblocks. In FIG. 4, for a current macroblock 410, three candidate texture motion vectors that have been rounded to integer valeus 411, 412, 414, denoted MV1, MV2 and MV3, and three corresponding shape motion vectors 421, 422, 423 designated as MVs1, MVs2, MVs3 are show. By looking at MVs1, MVs2, MVs3, MV1, MV2 and MV3 in this order, MVPs is determined by taking the first encountered MV that is valid. If no candidate MV is valid, MVPs is regarded as 0.

Based on the MVPs determined above, MVs is computed by the following procedure: The MC error is computed by comparing the predicted BAB (by MVPs) and current BAB. If the computed MC error is less or equal to 16×AlphaTH, where AlphaTH is a threshold used when comparing two 4×4 sub-blocks, the MVPs is directly employed as MVs, and the procedure terminates. If the above condition is not satisfied. MV is searched around the prediction vector MVPs. The search range is +/−16 pixels around MVPs along both horizontal and vertical directions. The MV that minimizes the SADs is taken as MVs and this is further interpreted as MVDs for shape.

While the current MPEG-4 shape coding technique described above takes into account the quality of the compressed bitstream in both the size and lossless phases of compression, it fails to address in any manner actual buffer constraints. Thus, although the existing technique may generate a bitstream having an acceptable level of quality, the bitstream may be useless in the event that the encoder's buffer has reached an overflow condition. Thus, there exists a need for an MPEG-4 shape coding technique which both generates a bistream having acceptable quality and takes into consideration actual buffer constraints.

SUMMARY OF THE INVENTION

An object of the present invention is to provide a MPEG-4 shape information coding technique which takes into account both the quality of the compressed bitstream and the actual buffer constraints of the system.

An additional object of the present invention is to incorporate a rate control algorithm in a process for encoding object based shape information.

A further object of the present invention is to provide an optimized MPEG-4 shape information encoding technique.

A still further object of the present invention is to provide a technique which represents a fast yet accurate approximation to an optimized MPEG-4 shape information encoding technique.

In order to meet these and other objects which will become apparent with reference to further disclosure set forth below, the present invention provides a method for controlling the generated bit rate of compressed video information in a digital video compression system that includes both a real buffer of size $B_{max}$, and a smaller virtual buffer of size $B_{visual}$, in order to ensure that the generated bit rate stay within the maximum buffer capacity. The method includes the steps of (a) receiving blocks of digital information that represent at least one identifiable characteristic for a portion of a frame of video, (b) determining whether a current block can be compressed by one of one or more shortcuts, and if so, compressing using a shortcut to compress the current block; (c) if the current block cannot be compressed with any of the shortcuts, determining whether the virtual buffer capacity will be exceeded if the current received block is compressed only by arithmetic coding, and if not, compressing the current block with only arithmetic coding; (d) if the current received block cannot be compressed with the shortcuts and if the virtual buffer capacity would be exceeded with only arithmetic coding, determining whether the virtual buffer capacity will be exceeded if the current block is compressed with both downsampling and arithmetic coding, and if not, compressing the current block with both downsampling and arithmetic coding; and (e) if all else fails, compressing the current block with a default mode of compression even if the virtual buffer capacity is exceeded with such compression.

Preferably, the digital video compression system is an MPEG-4 compliant shape code, the blocks of digital information are binary alpha blocks, and the identifiable characteristic is binary shape. In accordance with MPEG-4, the one or more shortcuts include a lossless compression mode representing an entirely white binary alpha block, a lossless compression mode representing an entirely black binary alpha block, and a lossless compression mode representing no change in an binary alpha block. The arithmetic coding is likewise content-based arithmetic encoding including intra-coding, inter-coding, intra-coding of a transpose, and inter-coding of a transpose. Advantageously, the selecting step in a preferred technique requires choosing the content-based arithmetic encoding yielding the fewest bits.

In one process, the downsampling is size compression at a ratio of 1:2, and the step of compressing a block with both downsampling and arithmetic coding includes both size compressing the current binary alpha block to ½ it original size and then selecting between intra-coding, inter-coding, intra-coding of a transpose, and inter-coding of a transpose of the size compressed binary alpha block. In a highly preferred process, if the current binary alpha block cannot be compressed with the shortcuts and if the virtual buffer capacity would be exceeded with either only arithmetic coding or with both size compression at a ratio of 1:2 and with arithmetic coding, the block is size compressed to ¼ it original size before selecting between intra-coding, inter-coding, intra-coding of a transpose, and inter-coding of a transpose of the size compressed binary alpha block.

The default mode of compression advantageously calls for size compressing the current binary alpha block to ¼ it original size and then selecting, from intra-coding of said size compressed binary alpha block, inter-coding of said size compressed binary alpha block, intra-coding of a transpose of said size compressed binary alpha block, and inter-coding of a transpose of said size compressed binary alpha block, the lossless compression mode yielding the fewest bits.

The accompanying drawings, which are incorporated and constitute part of this disclosure, illustrate a preferred embodiment of the invention and serve to explain the principles of the invention.

BRIEF DESCRIPTION OF THE DRAWINGS

FIGS. 10–15 are decoded outputs from an MPEG-4 shape decoder showing experimental results using the method of FIG. 9;

DESCRIPTION OF PREFERRED EMBODIMENT

As discussed in the Background of the Invention, known MPFG-4 shape coding techniques fail to account for the limited size of the encoder's buffer which temporarily stores encoded information prior to transmission or permanent storage. The present invention solves this problem by providing an MPEG-4 shape coding technique which, in accordance with known techniques, generates a bistream having acceptable quality, but unlike known techniques additionally takes into consideration actual buffer constraints. In order to provide such an improvement over the existing compression scheme, the present invention relies on principles from the general solution to the optimal buffered compression problem, and adapts those principles to the specifics of the MPEG-4 shape coding compression problem.

Trellis-based buffered compression is a well known technique for effecting rate control in state of the art video compression algorithms such as MPEG-2. For example, A. Ortega et al., "Optimal Trellis-Based Buffered Compression And Fast Approximatios," IEEE Transactions On Image Processing, 3(1) 26–40 (1994) describes a technique to provide optimal buffer control for video sequences in a finite buffer environment. The problem of optimal buffered compression is defined as follows: Given a set of quantizers, a sequence of blocks to be quantized, and a finite buffer, select the optimal quantizer for each block so that the total cost measure is minimized and the finite buffer never overflows.

Figure 1:
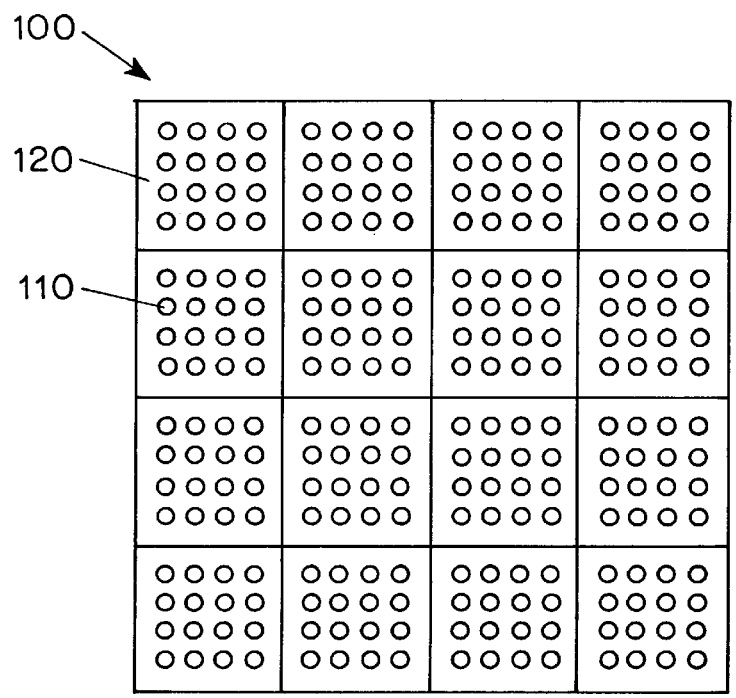
FIG. 1 is an illustrative diagram of a Binary Alpha Block in accordance with the MPEG-4 standard.
Figure 2:
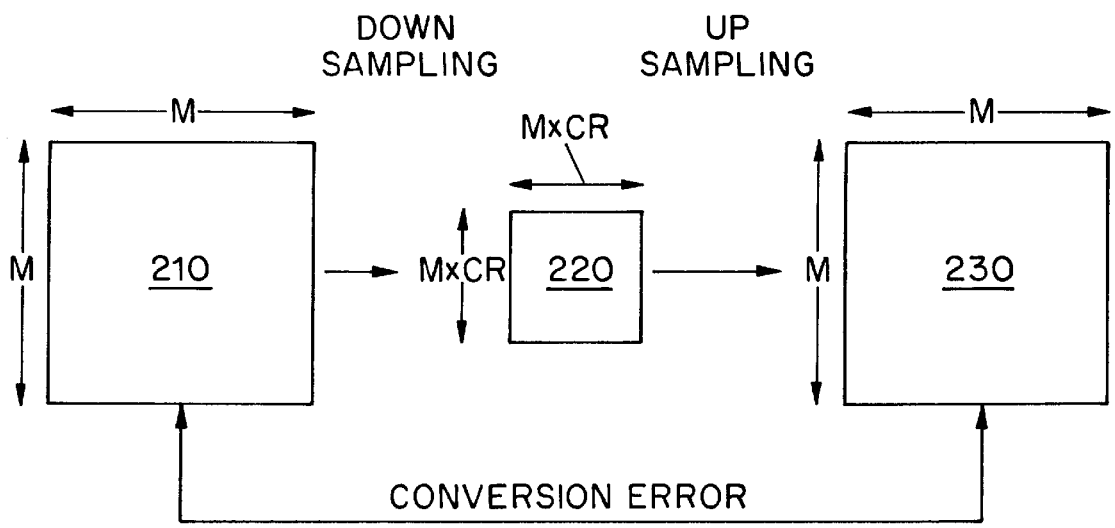
FIG. 2 is a schematic diagram of the size conversion process implemented in a typical MPEG-4 shape coding technique.
Figure 3:
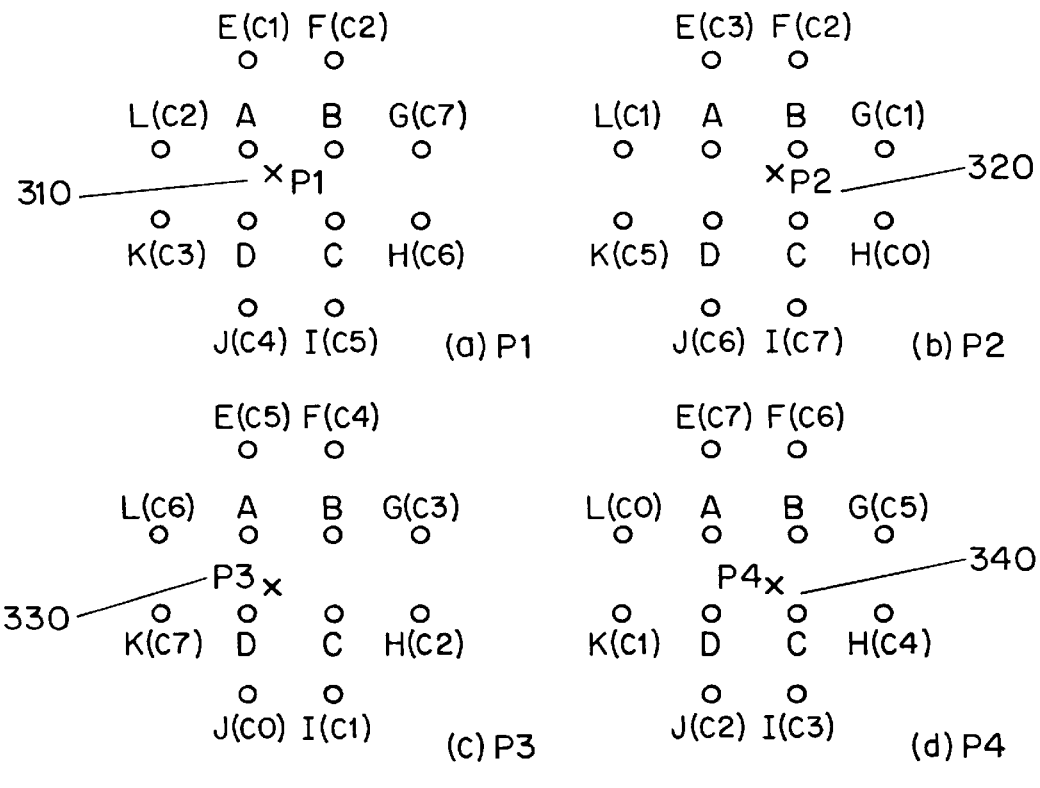
FIG. 3 is an illustrative diagram showing actual and interpolated pixels.
Figure 4:
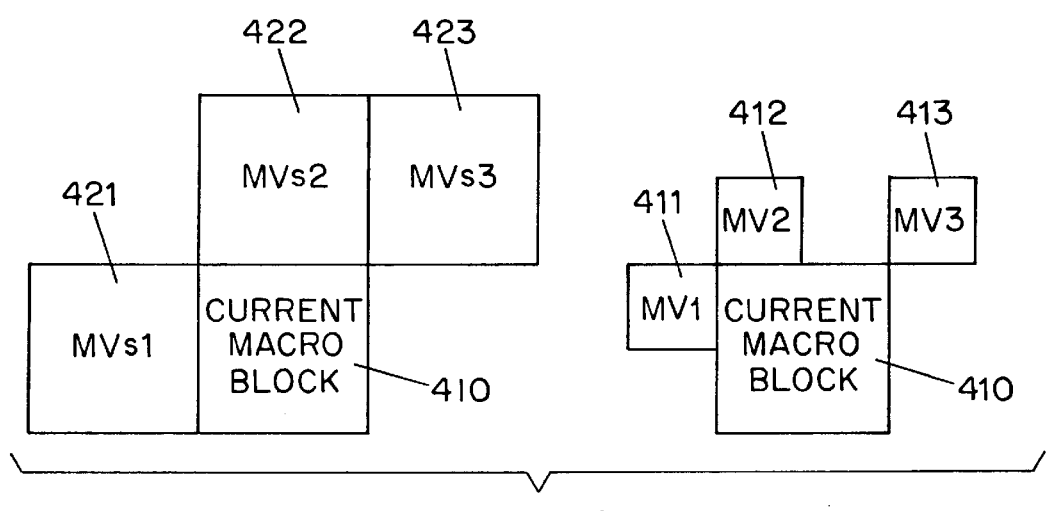
FIG. 4 is an illustrative diagram showing candidate shape and texture motion vectors for a representative macroblock.
Figure 5A:
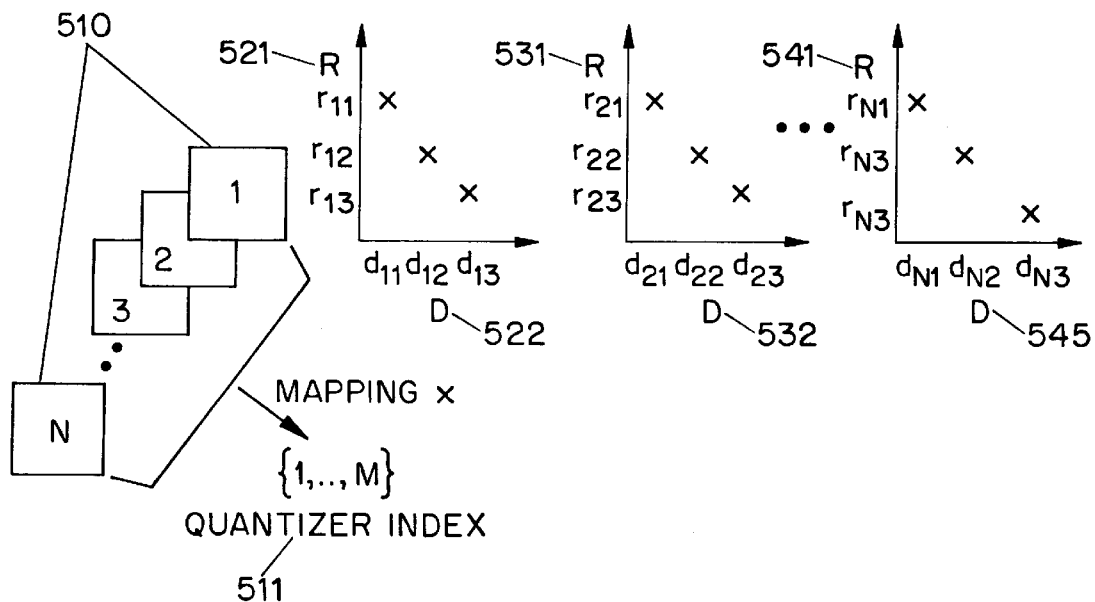
FIGS. 5(*a*) and 5(*b*) are illustrative diagrams showing rate and distortion characteristics for M blocks of data under N possible quantizers, and an unacceptable rate choice, respectively.
Figure 5B:
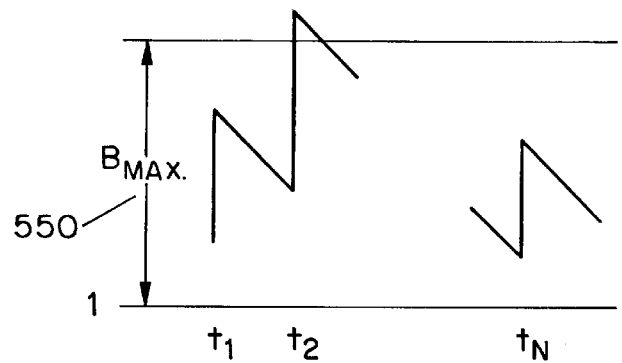

With reference to FIG. 5(*a*), for the general case of N blocks 510 and M available quantizers 511 to code each block, $d_{ij}$ and $r_{ij}$ represent the distortion and the number of bits produced by the coding, respectively, of block i with quantizer j, where r indicates the channel rate per block. Each block 510 in the sequence has a different rate 521, 531, 541 and distortion 522, 532, 542 characteristics. For a given choice of M quantizers 511 for the N blocks 510 in the sequence, R and D points can be used to form a composite characteristic. With reference to FIG. 5(*b*), the R at time $t_2$ is not a feasible solution for buffer size $B_{max}$ 550.

If an admissible solution x is defined as a selection of one quantizer for each block, i.e., a mapping from 1,2, . . . , N to 1,2, ..., M, x=x(1),x(2), ..., x(N), where each x(i) is the index of one of the M quantizers for block i. Therefore, $(r_{1x(1)}, \ldots, r_{Mx(N)})$, and $(d_{1x(1)}, \ldots, d_{Mx(N)})$ are, respectively, the rate and distortion for each block and a given choice of quantizers x.

Next, define the buffer occupancy at stage i, B(i) for a given admissible solution x. To account for the fact that the buffer occupancy cannot be negative at any stage (i.e., underflow means the buffer occupancy is 0), a recursive definition is used. Let $B(1)=r_{1x(1)}+B(0)$, $B(2)=\max(B(1)+r_{2x(2)}-r,0)$ and, in general $$B(i)=\max(B(i-1)+r_{ix(i)}-r,0) \quad (7)$$

where the buffer occupancy at each block instant is increased by the coding rate of the current block and decreased by the channel rate, and B(0) is the initial buffer state.

Accordingly, the problem is to find the mapping x that solves equation (8):

$$\min\left(\sum_{i=1}^{N} d_{ix(i)}\right), \quad (8)$$

subject to $$B(i) \leq B_{max}, \forall i=1, \ldots N \quad (9)$$

where $B_{max}$ is the buffer size.

In the MPEG-4 video context, the above described optimal buffered compression can be viewed of as the optimal solution for texture coding. The following description explains how to apply this solution to shape coding.

As described in the Background of the Invention, the current MPEG-4 binary shape coding process consists of two steps, both of which may impact buffer rate. Distortion is introduced during the first step, the size conversion process, by the way shape data are scaled down and up based on the value chosen for the threshold alpha_th. During the second step, content-based arithmetic encoding is applied. Since arithmetic coding itself is lossless, the size conversion process may be viewed as a "virtual quantizer."

In the size conversion process, distortion is introduced in two levels, during VOP level size conversion and during the following macroblock level size conversion. Viewing these conversion precesses as a virtual quantizer, the buffer rate control problem may be formulated with reference to equations (8) and (9). If B(i) is the ith macroblock, B(i)_CR the CR value chosen in the size conversion process for that macroblock, VOP(B(i)) the corresponding VOP which includes the ith macroblock, and VOP(B(i))_CR the CR value chosen in the size conversion process for that VOP, and x is defined as $\{x(1),x(2), \ldots, x(N)\}$ where x(i)=(VOP (B(i))_CR, B(i)_CR), the problem is reformulated as one to find the mapping x that solves equation (8) to minimize distortion while not violating equation (9).

Figure 6:
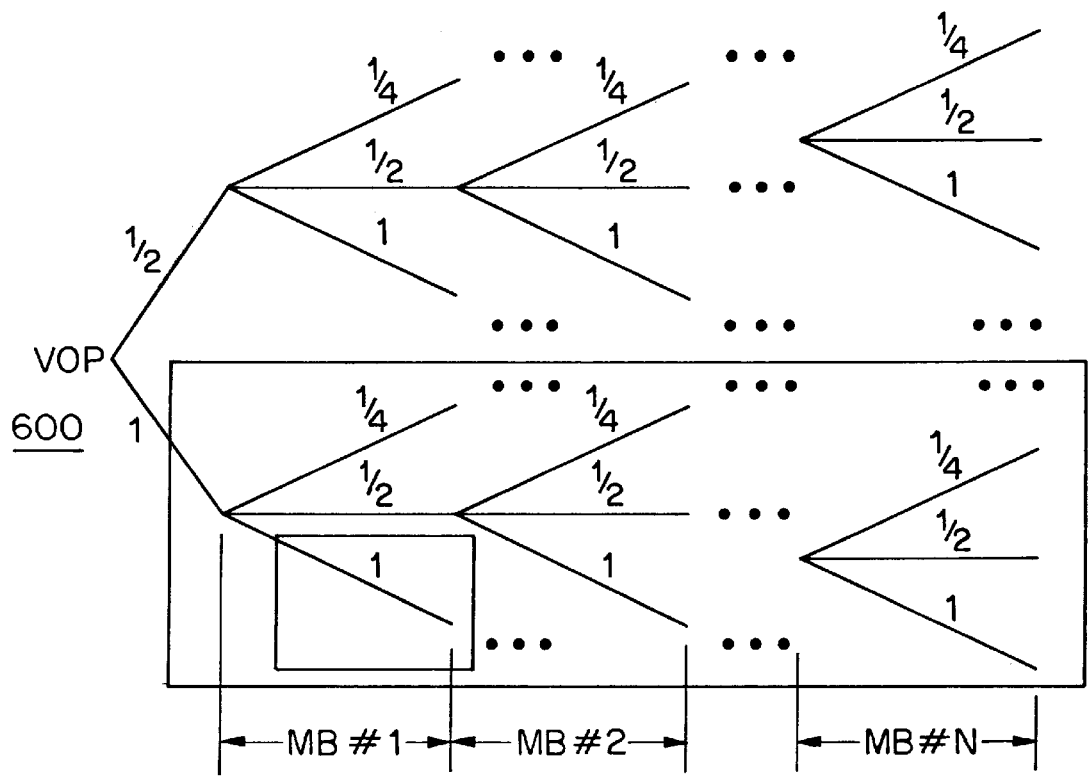
FIG. 6 is an illustrative drawing showing possible coding choices for a VOP and its associated macroblocks.

Referring now to FIG. 6, the possible values of CR for a certain VOP 600 and for the N macrblocks within that VOP are shown. A certain path in the figure implies a quality and rate of a specific output shape data sequence. Each branch has two values involved: VOP_CR and MB_CR. In the foregoing description, the case were VOP_CR=1 will be considered. however, those skilled in the art will appreciate that with minor modifications, the technique described herein applies equally to the case where VOP_CR may be either 1 or ½.

The problem of optimal shape coding is to choose a certain path which minimizes overall distortion yet keeps the buffer occupancy under $B_{max}$ as defined in Equations (8) and (9). Note that in this problem formulation, a global minimum is sought. However, if distortion is considered independent and additive with respect to each macroblock, an optimal path can be obtained by Bellman's principle.

Bellman's principle states that a subpath is also optimal if a path is optimal when the objective function is independent and additive with respect to each branch. This means that a CR value can be chosen which minimizes distortion at each macroblock stage. Such a rule of decision implies both local and global minimization. For example, if there is no buffer limitation involved, the path which has CR=1 at every macroblock (the lowest path in the figure) is the optimal path. In reality, the optimal path is chosen based on the occupancy of the encoder buffer. If a branch is not allowed due to current buffer occupancy, other branches which generate smaller bits are considered. The decision is made only by the buffer status at the current BAB.

The optimal path can thus be obtained by the following rule: at each macroblock, a CR which generates smallest distortion is chosen unless the buffer is overflowed. If there is more than one branch which produce the same distortion, the CR which produces fewer bits is chosen. Since the number of virtual quantizers is just 3, i.e., corresponding to CR values of 1, ½, and ¼, this algorithm is computationally efficient.

Once a CR is chosen for a specific macroblock, a decision regarding which "lossless" compression mode to be used must be made. To ensure bitstream compatibility in the MPEG-4 context, the each of the 7 BAB coding modes required by MPEG-4 are utilized.

The all_0 and all_255 modes generate fewer bits than the "No Update" modes when all data in a BAB are 0 or 255, respectively, and therefore should be considered before the "No Update" modes. The all_0 and all_255 modes are only considered at CR=1. The "No Update" modes are used when MC_BAB exactly matches the current BAB. The intra-coding mode, "IntraCAE," is carried out after previous modes are tried, and from the second frame on after previous modes are tried.

The quality of the generated bitstream is essentially independent of the choice in BAB mode since codes are lossless. Thus, any quality distortion comes only from the size conversion process. Since all BAB modes yield the same quality but generate different quantities of bits, the best policy is to choose the BAB mode which yields the smallest number of bits, as long as the buffer is not overflowed.

When CR=1, the lossless encoding mode which yields the fewest bits should be chosen since there is no distortion at th is CR value. Of course, if a CR value of ½ or ¼ also produces no distortion for the same BAB, the latter value should be chosen to further reduce the number of bits needed to represent the BAB, regardless of lossless compression.

When CR=½ or ¼, distortion usually occurs. In such cases, the encoding mode which realizes the minimum distortion should be chosen among the BAB coding modes, as long as the choice does not create buffer overflow. When there is more than one mode which creates the same distortion, the mode which generates the smallest bits should be chosen. Again, if both CR values of ½ or ¼ produce similar distortion for the same BAB, the latter value should be chosen to further reduce the numnber of bits needed to represent the BAB, regardless of lossless compression.

The final step in the BAB mode decision is to compare the shortest intra code with shortest inter code. For this comparison, it is necessary to add the number of bits for MVDs to the inter code length. Note that for the same value of CR, the same distortion can be expected. Thus, the shortest code length should be chosen.

Note that the allowance of an interCAE mode necessitates the used of motion vectors. In order to comply with MPEG-4, alpha_th should be set to 0, meaning that the mode where the search range of MV is +/−16 pixels around MVPs is always "turned on." Note that +/−16 pixels area is quite large. Therefore, in most cases, the motion vectors of shape coding will be closed to the motion vectors used in texture coding.

If all possible compression modes for a certain macroblock generate buffer overflow, the previous macroblock should be recompressed with fewer bits in order to find a feasible optimal path. In theory, the buffer size and all past data should be kept until the entire coding procedure ends, because the possibility of buffer overflow during the compression of any future macroblock may require backstepping through the compression process.

Figure 7:
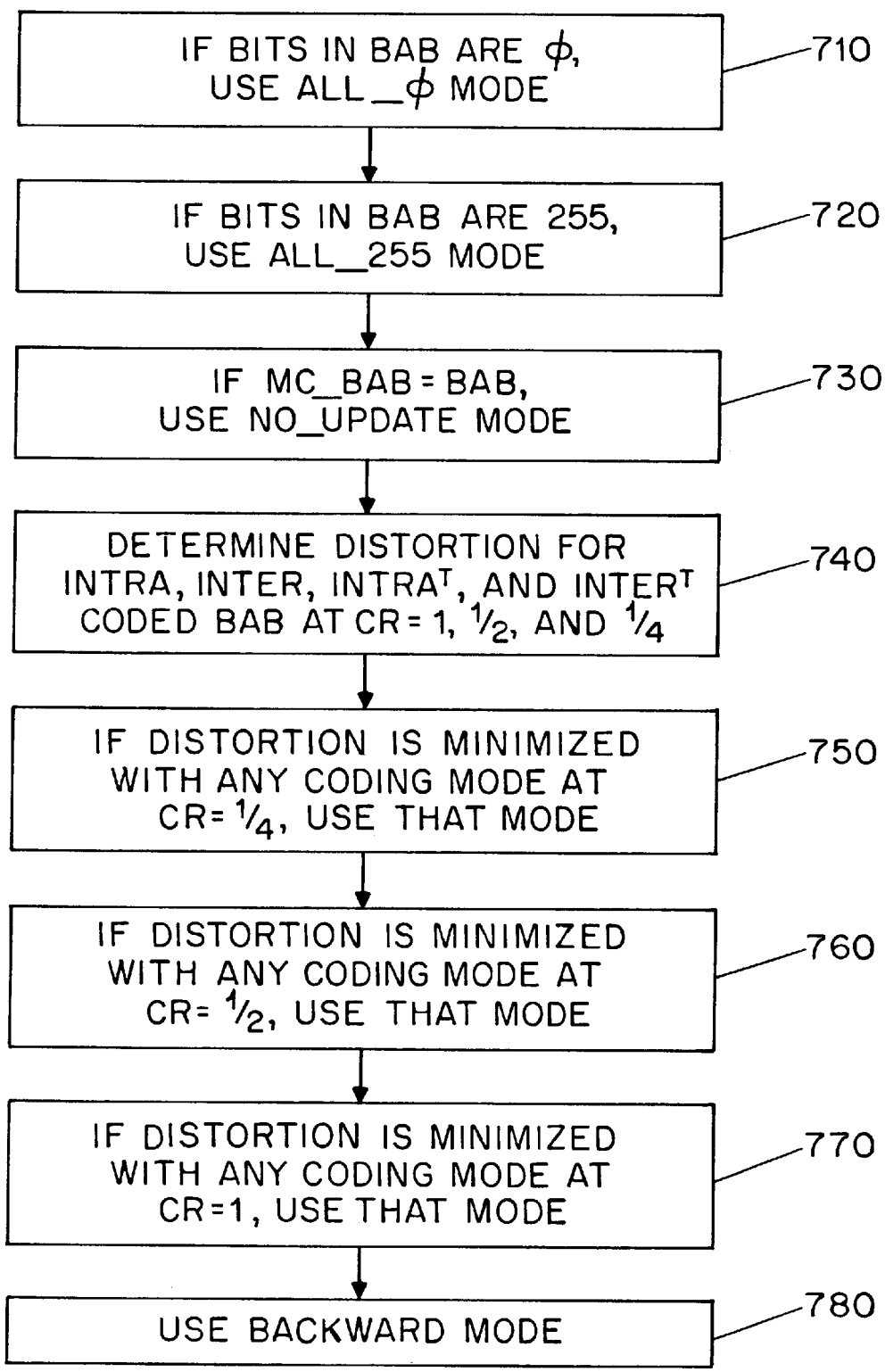
FIG. 7 is a flow diagram showing an optimized buffered shape coding method in accordance with the present invention.

Referring to FIG. 7, a flow chart showing illustratingthe optimized shape encoding process will now be described. If all bits in the BAB are 0, the all_0 mode is chosen 710. If all bits in the BAB are 255, the all_255 mode is chosen 720. Steps 710 and 720 correspond to conditions where the BAB is black or white. If steps 710 and 720 are inapplicable, a comparison of MC_BAB and BAB is made to determine whether to use the No Update modes 730. If steps 730 is also inapplicable, the distortion an number of bits required for intra-coded, inter-coded, transposed intra-coded and transposed inter-coded BABs at CR values of 1, ½ and ¼ is determined 740. If the distortion is minimized for any type of lossless encoding at CR=¼, CR=¼ is chosen along with the mode of lossless encoding which generates the fewest bits 750. If the distortion is minimized for any type of lossless encoding at CR=½, CR=½ is chosen along with that mode of lossless encoding which generates the fewest bits 760. If the distortion is minimized for any type of lossless encoding at CR=1, CR=1 is chosen along with that mode of lossless encoding which generates the fewest bits 770. Finally, if all else fails, the default backwards mode 780 is adopted.

Appendix I contains exemplary psudo-code for implementingthe optimal path decision process described above. In Appendix 1, $MODE_{min}$ represents the choice function for an encoding mode among various candidate modes, and is defined to select the mode which generates the smallest number of bits when more than one distortion parameters are of the same value. The nomenclature $D_{(encode)}(CR=cr)$ is used to connote the distortion when a particular encoding method is used for the compression at a particular size conversion, and is defined as infinite when there is no encoding mode which makes the current buffer occupancy under the maximum buffer size. Thus, $D_{intraCAE}$ (CR=1), $D_{interCAE}$ (CR=1), $D_{intraCAE}$ (CR=½), $D_{interCAE}$ (CR=½), $D_{intraCAE}$ (CR=¼), and $D_{intraCAE}$ (CR=¼) represent the distortion after a particular BAB has been subjected to size compression at the CR value indicated, and to noisless compression of the type indicated in the subscript. Likewise, the terms $D^T_{intraCAE}$ (CR=1), $D^T_{intraCAE}$ (CR=1), $D^T_{intraCAE}$ (CR=½), $D^T_{interCAE}$ (CR=½), $D^T_{intraCAE}$ (CR=¼) and $D^T_{intraCAE}$ (CR=¼) are all representative of distortion just after "transposed data" are context-based arithmetic encoded. Note that if the selected coding condition involves transposition of the BAB, then "ST" flag inthe bitstreamis set "1" instead of the default "0" value.

As described above, for the theoretically optimal solution, the past buffer size and data should be preserved while the coding procedure is going on. However, this is impractical, since the algorithm makes the coding delay extremely long. In addition, to consider all the modes of lossless compression under the various values of CR requires certain amount of computation. To make the algorithm more feasible and make computational demands realistic, two assumptions can be made.

First, it is assumed that an image reconstructed from data which was compressed at the value of CR=½ shows less distortionthan one recovered from CR=¼, and that an image that was not subject to size compression (CR=1) is likewise superior to one compressed at CR=½. Based on this assumption, CR=1 should always be chosen over CR=½, and CR=½ over CR=¼, if the choice does not cause buffer overflow. Therefore, once we meet such an image which gives non-overflow buffer condition, we don't need to go further; the algorithm for CR ends here. In reality, this assumption is almost always true. Use ofthis assumption avoids the unnecessary computation of distortion values, since the distortion is the same whatever BAB coding mode is selected.

Second, it is assumed that the number of permissible backward steps may be limited The backward unit of the optimal algorithm discussed above is computationally intensive, requiring infinite memory for the optimal path computation. The optimal path algorithm can be modified to exploit a finite number of backward steps when the current buffer cannot be lower than $B_{max}$ with any CR value. Exemplary pseudo-code for realizing such a modified algorithm is presented in Appendix II, which uses the terms defined as follows. $B_{intraCAE}$ (CR=1) means the current buffer size just after intraCAE(CR=1) is applied. $B_{intraCAE}$ (CR=1)means the currentbuffer size just after interCAE (CR=1) is applied. Similar meanings are ascribed to $B_{intraCAE}$ (CR=½), $B_{intraCAE}$ (CR=½) $B_{intraCAE}$ (CR=¼), and $B_{intraCAE}$ (CR=¼). Likewise, the terms $B^T_{intraCAE}$ (CR=1), $B^T_{intraCAE}$ (CR=1), $B^T_{intraCAE}$ (CR=½), $B^T_{intraCAE}$ (CR=½), $B^T_{intraCAE}$ (CR=¼) and $B^T_{intraCAE}$ (CR=¼) are all the expressions for the buffer size just after "transposed data" are context-based arithmetic encoded.

Experimental testing has shown that the changing the maximum buffer size does not significantly impact the steady state quality of the reconstructed image. Building on this finding an using the above discussed assumptions, a description of a marginal buffer reservation process which approximates the optimum solution but does not require the preservation of past data is now discussed.

Figure 8:
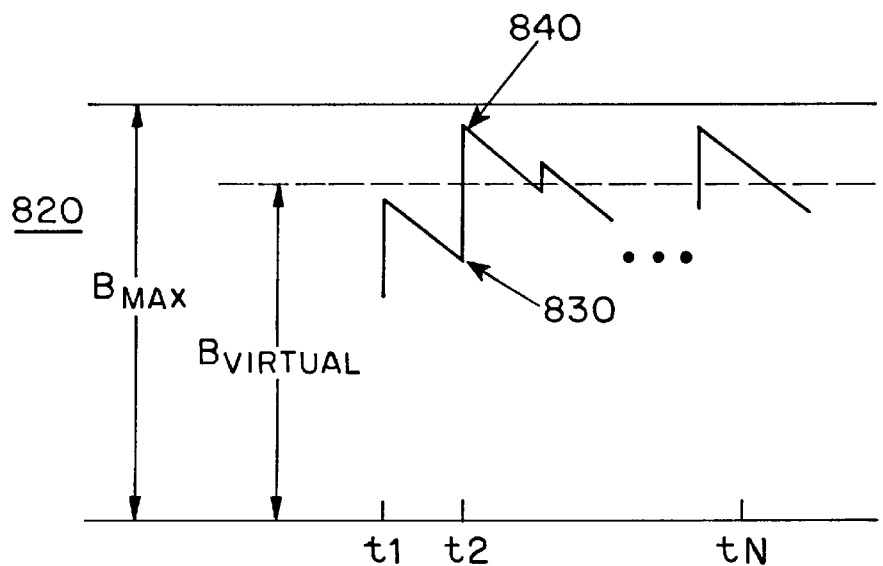
FIG. 8 is an illustrative drawing relating a virtual buffer to an actual buffer.

Since varying the maximum size of the buffer does not significantly impact the performance of the above-described buffered compression process, it follows that the process may be applied with reference to a "virtual" buffer having less capacity than the actual (physical) buffer. Referring to FIG. 8, a virtual buffer 810 of size $B_{visual}$ is shown. $B_{visual}$ is chosen to be less than the actual buffer size $B_{max}$ 820. Choosing virtual buffer 810 in this way permits a compression process to overflow $B_{visual}$ without causing actual overflow.

Whenever $B_{visual}$ is exceeded, the process requires all future BABs to be encoded at CR=¼ until the buffer occupancy is again below $B_{visual}$. If $B_{visual}$ 810 is defined sufficiently below $B_{max}$ 820, $B_{max}$ 820 will not be exceeded even when the buffer occupancy is nearly at $B_{visual}$ 830, and the buffer is filled with a CR=1 BAB 840. The buffer occupancy will thus have the opportunity to return to a level below $B_{visual}$ within a few macroblocks. Under such circumstances, the backwards mode discussed above is completely avoided.

Figure 9:
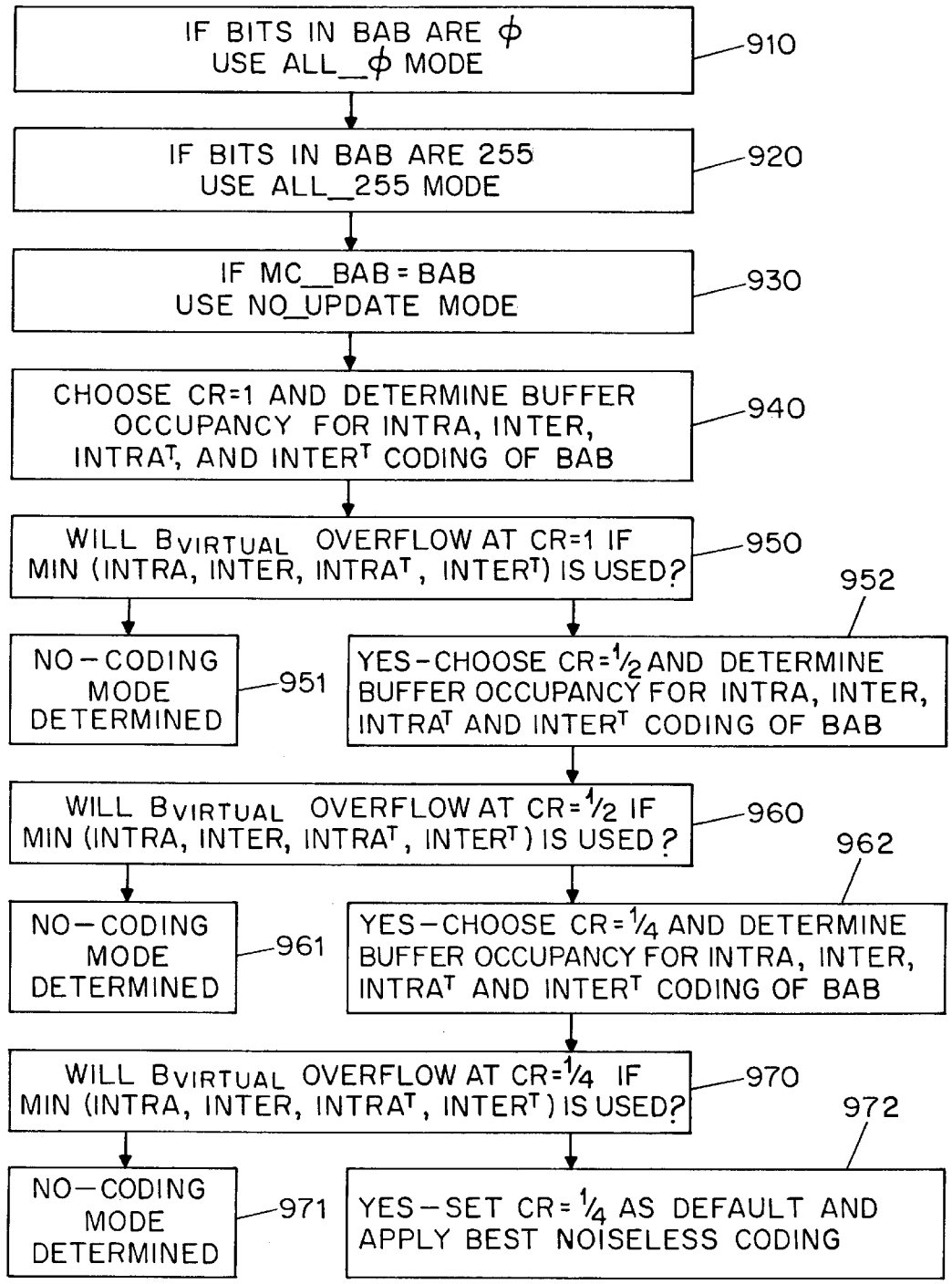
FIG. 9 is a flow diagram showing a marginal buffered shape coding method in accordance with a preferred embodiment of the present invention.

Referring now to FIG. 9, a flow chart showing illustrating the marginal shape encoding process will now be described. Note that the first three steps are identical to those described with reference to FIG. 7. Thus, if all bits in the BAB are 0, the all_0 mode is chosen 910; if all bits in the BAB are 255, the all_255 mode is chosen 920, and if steps 910 and 920 are inapplicable, a comparison of MC_BAB and BAB is made to determine whether to use the No_Update mode 930.

If step 930 is also inapplicable, CR is chosen to be 1 and four possible buffer occupancies, indicating how full the buffer would be if the BAB under consideration is intra-coded, inter-coded. transposed and intra-coded, or transposed and inter-coded for the size compression value of CR=1, are determined 940. If the smallest of the four possible buffer occupancies is less than the virtual buffer size $B_{visual}$ 950, CR is set to 1 and the compression mode yielding that buffer occupancy is chosen as the lossless compression mode for the BAB 951. If none of the four possible compression modes yields a buffer occupancy less than the virtual buffer size $B_{virtual}$, CR is chosen to be ½ and four possible buffer occupancies, indicating how full the buffer would be if the BAB under consideration is intra-coded, inter-coded, transposed and intra-coded, or transposed and inter-coded for the size compression value of CR=½, are determined 952.

Next, if the smallest of the four possible buffer occupancies is less than the virtual buffer size $B_{visual}$ 960, CR is set to ½ and the compression mode yielding that buffer occupancy is chosen as the lossless compression mode for the BAB 961. If none of the four possible compression modes yields a buffer occupancy less than the virtual buffer size $B_{visual}$, CR is chosen to be ¼ and four possible buffer occupancies, indicating how full the buffer would be if the BAB under consideration is intra-coded, inter-coded, transposed and intra-coded, or transposed and inter-coded for the size compression value of CR=¼, are determined 962.

If the smallest of the four possible buffer occupancies is less than the virtual buffer size $B_{visual}$ 970, CR is set to ¼ and the compression mode yielding that buffer occupancy is chosen as the lossless ompression mode for the BAB 971. If none of the four possible compression modes yields a buffer occupancy less than the virtual buffer size $B_{visual}$, a situation has occurred wherein the virtual buffer will overflow. However, since the virtual buffer size $B_{visual}$ was chosen to be smaller than the actual buffer size $B_{max}$, such an overflow condition can be tolerated. fn this case, CR is set to ¼ and the lossless compression mode yielding the fewest number of bits should be chosen for the BAB 972.

Appendix III contains exemplary psudo-code for implementing the marginal shape encoding process described with reference to FIG. 9. Experimental results using this algorithm are illustrated in FIGS. 10–17. FIG. 10 shows decoded frames (a)–(f) from an MPEG-4 shape decoder having a $B_{max}$, of 1000 bits and a $B_{visual}$, of 960 bits, where the outgoing channel rate is 6 bits/BAB_block. FIG. 11 shows decoded frames (a)–(f) from an MPEG-4 shape decoder having a $B_{max}$, of 500 bits and a $B_{visual}$ of 460 bits, where the outgoing channel rate is 6 bits/BAB_block. FIG. 12 shows decoded frames (a)–(f) from an MPEG-4 shape decoder having a $B_{max}$, of 1000 bits and a $B_{visual}$ of 980 bits, where the outgoing channel rate is 7 bits/BAB_block. FIG. 13 shows decoded frames (a)–(f) from an MPEG-4 shape decoder having a $B_{max}$, of 500 bits and a $B_{visual}$ of 480 bits, where the outgoing channel rate is 7 bits/BAB_block. FIG. 14 shows decoded frames (a)–(f) from an MPEG-4 shape decoder having a $B_{max}$, of 1000 bits and a $B_{visual}$ of 990 bits, where the outgoing channel rate is 8 bits/BAB_block. FIG. 15 shows decoded frames (a)–(f) from an MPEG-4 shape decoder having a $B_{max}$, of 500 bits and a $B_{visual}$ of 490 bits, where the outgoing channel rate is 8 bits/BAB_block.

Figure 16A:
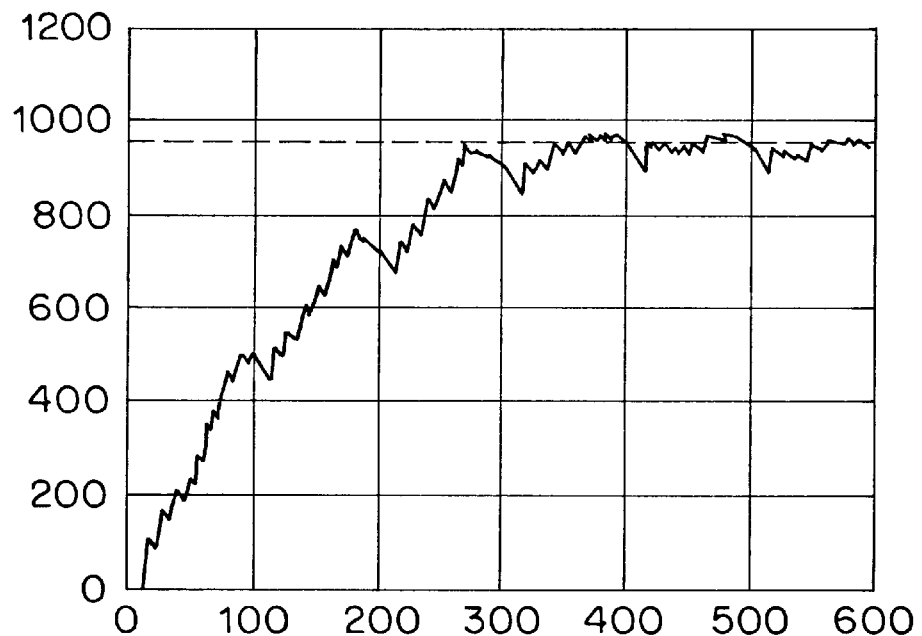
FIGS. 16(*a*)–(*c*) are charts plotting buffer occupancy vs. macroblock number were $B_{max}$, is 1000 bits.
Figure 16B:
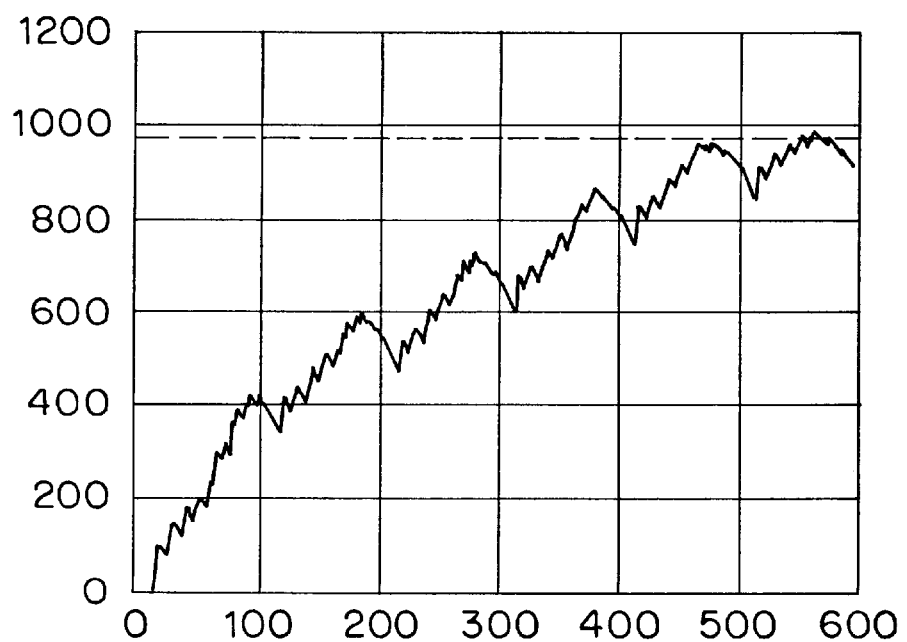
Figure 16C:
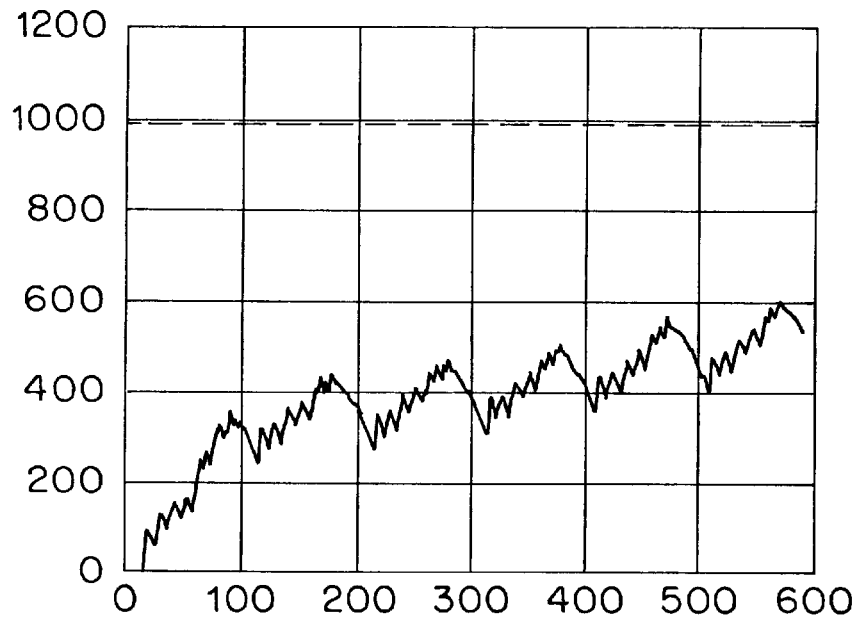
Figure 17A:
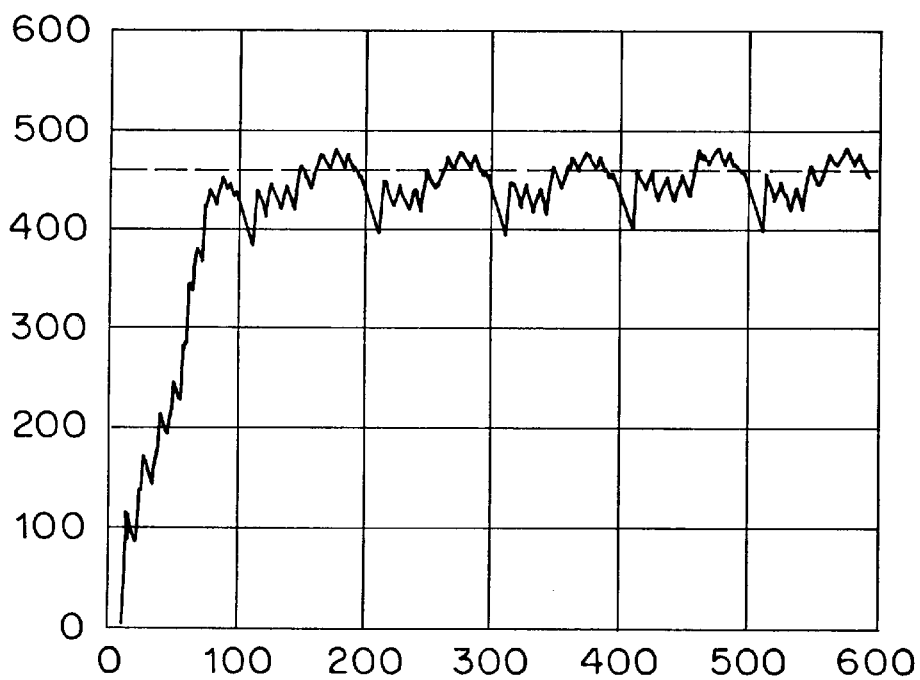
FIGS. 17(*a*)–(*c*) are charts plotting buffer occupancy vs. macroblock number were $B_{max}$, is 500 bits.
Figure 17B:
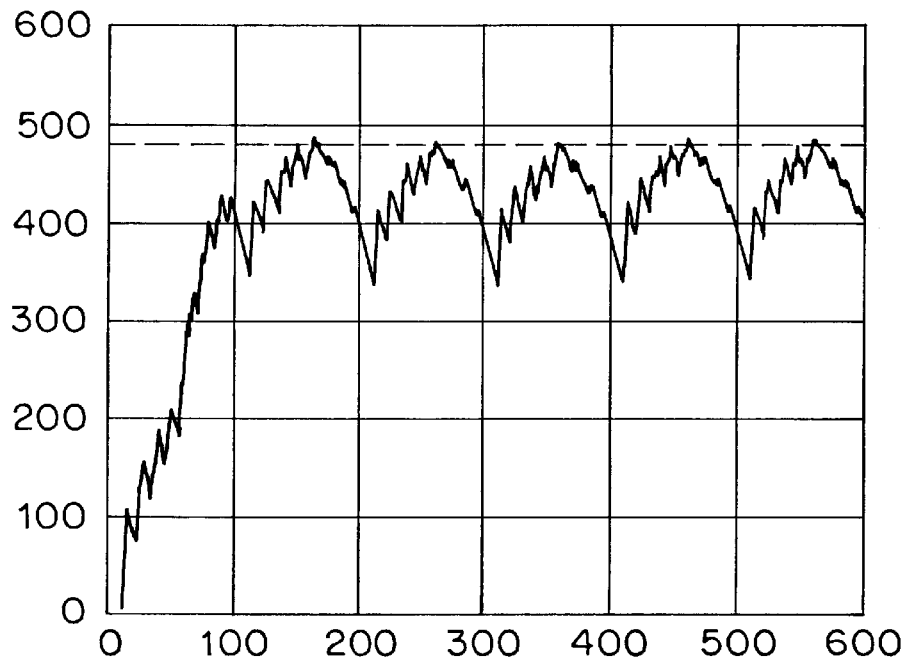
Figure 17C:
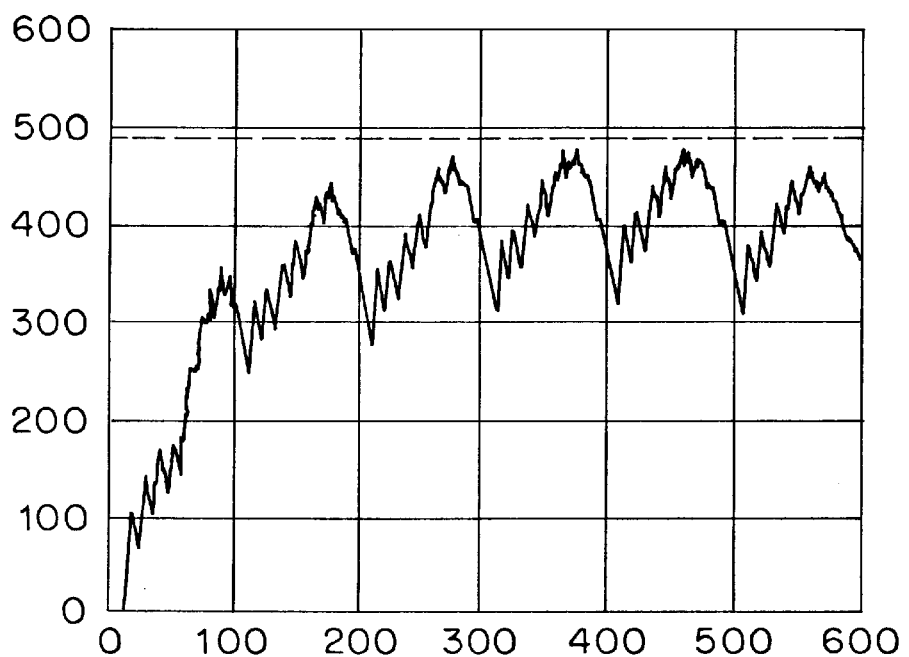

FIGS. 16(a)–(c) show 3 graphs plotting buffer occupancy vs. macroblock number for the three experiments described above that use $B_{max}$, of 1000 bits. FIG. 16a applies to the case where $B_{visual}$ is 960 bits and the outgoing channel rate is 6 bits/BAB_block, FIG. 16b applies to the case where $B_{visual}$ is 980 bits and the outgoing channel rate is 7 bits/BAB_block, and FIG. 16c applies to the case where $B_{visual}$ is 990 bits and the outgoing channel rate is 8 bits/BAB_block. FIGS. 17 (a)–(c) show 3 graphs plotting buffer occupancy vs. macroblock number for the three experiments using $B_{max}$, of 500 bits. FIG. 17a applies to the case where $B_{visual}$ is 460 bits and the outgoing channel rate is 6 bits/BAB_block, FIG. 17b applies to the case where $B_{visual}$ is 480 bits and the outgoing channel rate is 7 bits/BAB_block, and FIG. 17c applies to the case where $B_{visual}$ is 490 bits and the outgoing channel rate is 8 bits/BAB_block.

The foregoing merely illustrates the principles of the invention. Various modifications and alterations to the described embodiments will be apparent to those skilled in the art in view of the teachings herein. For example, although the disclosure herein is directed to the compression of binary shape information for an MPEG-4 compliant bitstream, the invention has general applicability to any video compression process requiring the minimization of distortion under buffer constraints. It will thus be appreciated that those skilled in the art will be able to devise numerous systems and methods which, although not explicitly shown or described herein, embody the principles of the invention and are thus within the spirit and scope of the invention.

APPENDIX I

```
if(ALL0(BAB)) {
            all.0 mode;
}
else if (ALL255(BAB)) {
            all.255 mode;
}
else if (MC_BAB == BAB) {
            no Update mode;
}
else {
```

$mode_1 = \text{MODE}_{\min}(D_{\text{intra}}CAE(CR = 1), D_{\text{inter}}CAE(CR = 1), D_{\text{intra}}^{T}CAE(CR = 1), D_{\text{intra}}^{T}CAE(CR = 1));$ $mode_2 = \text{MODE}_{\min}(D_{\text{intra}}CAE(CR = \tfrac{1}{2}), D_{\text{inter}}CAE(CR = \tfrac{1}{2}), D_{\text{intra}}^{T}CAE(CR = \tfrac{1}{2}), D_{\text{intra}}^{t}CAE(CR = \tfrac{1}{2}));$ $mode_3 = \text{MODE}_{\min}(D_{\text{intra}}CAE(CR = \tfrac{1}{4}), D_{\text{inter}}CAE(CR = \tfrac{1}{4}), D_{\text{intra}}^{T}CAE(CR = \tfrac{1}{4}), D_{\text{intra}}^{T}CAE(CR = \tfrac{1}{4}));$

```
            if(D_mode3(CR = 1/4) is the smallest distortion) {
            Use mode_3;
}
else if(D_mode3(CR = 1/2) is the smallest distortion) {
            Use mode_2;
}
else  if(D_mode1(CR = 1) is the smallest distortion) {
            Use mode_1;
}
else {
            Backward mode;
            }
}
```

APPENDIX II

```
if(ALL0(BAB)) {
            all.0 mode;
}
else if (ALL255(BAB)) {
            all.255 mode;
}
else if (MC_BAB == BAB) {
            no Update mode;
}
```
else if(Min{$B_{intra}CAE(CR = 1)$, $B_{inter}CAE(CR = 1)$, $B_{intra}^{T}CAE(CR = 1)$, $B_{inter}^{T}CAE(CR = 1)$} < $B_{max}$) {

Use  $MODE_{min}(B_{intra}CAE(CR = 1), B_{inter}^{T}CAE(CR = 1), B_{intra}^{T}CAE(CR = 1),$
$B_{inter}^{T}CAE(CR = 1))$;

} else if(Min{$B_{intra}CAE(CR = ½)$, $B_{inter}CAE(CR = ½)$, $B_{intra}^{T}CAE(CR = ½)$, $B_{inter}^{T}CAE(CR = ½)$} < $B_{max}$) {

Use  $MODE_{min}(B_{intra}CAE(CR = ½), B_{inter}^{T}CAE(CR = ½), B_{intra}^{T}CAE(CR = ½),$
$B_{inter}^{T}CAE(CR = ½))$;

} else if(Min{$B_{intra}CAE(CR = ¼)$, $B_{inter}CAE(CR = ¼)$, $B_{intra}^{T}CAE(CR = ¼)$, $B_{inter}^{T}CAE(CR =)$} < $B_{max}$) {

Use  $MODE_{min}(B_{intra}CAE(CR = ¼), B_{inter}^{T}CAE(CR = ¼), B_{intra}^{T}CAE(CR = ¼),$
$B_{inter}^{T}CAE(CR = ¼))$;

}

```
else if("the number of backward' <= a pre-fixed number) {
            Backward mode;
}
else {
            Choose CR = ¼ and perform CAE;
}
```

40

APPENDIX III

```
if(ALL0(BAB)) {
        all.0 mode;
}
else if (ALL255(BAB)) {
        all.255 mode;
}
else if (MC_BAB == BAB) {
        no Update mode;
}
else if(Min{B_intra CAE(CR = 1), B_inter CAE(CR = 1), B^T_intra CAE(CR = 1), B^T_inter CAE(CR = 1)} <
B_virtual) {
        Use  MODE_min(B_intra CAE(CR = 1), B^T_inter CAE(CR = 1), B^T_intra CAE(CR = 1),
B^T_inter CAE(CR = 1));
}
else if(Min{B_intra CAE(CR = ½), B_inter CAE(CR = ½), B^T_intra CAE(CR = ½), B^T_inter CAE(CR = ½)}
 < B_virtual) {
        Use  MODE_min(B_intra CAE(CR = ½), B^T_inter CAE(CR = ½), B^T_intra CAE(CR = ½),
B^T_inter CAE(CR = ½));
}
else if(Min{B_intra CAE(CR = ¼), B_inter CAE(CR = ¼), B^T_intra CAE(CR = ¼), B^T_inter CAE(CR =)} <
B_virtual) {
        Use  MODE_min(B_intra CAE(CR = ¼), B^T_inter CAE(CR = ¼), B^T_intra CAE(CR = ¼),
B^T_inter CAE(CR = ¼));
}
else {
        Choose CR = ¼ and perform CAE;
}
```

We claim:

1. In a digital video compression system comprising a real buffer having a maximum buffer capacity and virtual buffer having a virtual buffer capacity, said virtual buffer capacity being less than said maximum buffer capacity, a method for controlling the generated bit rate of compressed video information to keep within said maximum buffer capacity comprising the steps of:
   (a) receiving one or more blocks of digital information, each block representing at least one identifiable characteristicfor a portion of a frame of video;
   (b) determining whether a current received block can be compressed by one of one or more shortcuts, and if so, compressing said current received block with one of said shortcuts;
   (c) if said current received block cannot be compressed with said shortcuts, determining whether said virtual buffer capacity will be exceeded if said current received block is compressed only by arithmetic coding, and if not, compressing said current received block with only arithmetic coding;
   (d) if said current received block cannot be compressed with said shortcuts and if said virtual buffer capacity would be exceeded with only arithmetic coding, determining whether said virtual buffer capacity will be exceeded if said current received block is compressed with both downsampling and arithmetic coding, and if not, compressing said current received block with both said downsampling and said arithmetic coding; and
   (e) if said current received block cannot be compressed with said shortcuts and if said virtual buffer capacity would be exceeded with only arithmetic coding or with both downsampling and arithmetic coding, compressing said current received block with a default mode of compression even if said virtual buffer capacity is exceeded with such compression.

2. The method of claim 1, wherein said digital video compression system is an MPEG-4 compliant shape code, said one or more blocks of digital information arc binary alpha blocks, and said current received block is a current binary alpha block.

3. The method of claim 2, wherein said at least one identifiable characteristic is binary shape.

4. The method of claim 2, wherein said one or more shortcuts comprise a lossless compression mode representing an entirely white binary alpha block, a lossless compression mode representing an entirely black binary alpha block, and a lossless compression mode representing no change in an binary alpha block.

5. The method of claim 2, wherein said arithmetic coding comprises content-based arithmetic encoding.

6. The method of claim 5, wherein said step of content-based arithmetic encoding comprises the step of selecting between intra-coding of said binary alpha block, inter-coding of said binary alpha block, intra-coding of a transpose of said binary alpha block, and inter-coding of a transpose of said binary alpha block.

7. The method of claim 6, wherein said selecting step comprises choosing the content-based arithmetic encoding yielding the fewest bits.

8. The method of claim 2, wherein downsampling is size compression at a ratio of 1:2, and said step of compressing said current received block with both said downsampling and arithmetic coding comprises size compressing said current binary alpha block to ½ it original size and then selecting between intra-coding of said size compressed binary alpha block, inter-coding of said size compressed binary alpha block, intra-coding of a transpose of said size compressed binary alpha block, and inter-coding of a transpose of said size compressed binary alpha block.

9. The method of claim 8, further comprising the step of determining, if said current binary alpha block cannot be compressed with said shortcuts and if said virtual buffer capacity would be exceeded with either only arithmetic coding or with both size compression at a ratio of 1:2 and with arithmetic coding, size compressing said current binary alpha block to ¼ it original size and then selecting between intra-coding of said size compressed binary alpha block, inter-coding of said size compressed binary alpha block, intra-coding of a transpose of said size compressed binary alpha block, and inter-coding of a transpose of said size compressed binary alpha block.

10. The method of claim 9, wherein said default mode of compression comprises size compressing said current binary alpha block to ¼ it original size and then selecting, from intra-coding of said size compressed binary alpha block, inter-coding of said size compressed binary alpha block, intra-coding of a transpose of said size compressed binary alpha block, and inter-coding of a transpose of said size compressed binary alpha block, the lossless compression mode yielding the fewest bits.

11. A method for compressing digital video information by downsampling and arithmetic encoding while controlling the generated bit rate of compressed video information to keep within a maximum buffer capacity by employing a virtual buffer having a capacity being less than said maximum buffer capacity, comprising the steps of:
   (a) receiving one or more blocks of digital information, each block representing at least one identifiable characteristic for a portion of a frame of video;
   (b) determining whether a current received block can be compressed by one of one or more shortcuts, and if so, compressing said current received block with one of said shortcuts;
   (c) if said current received block cannot be compressed with said shortcuts; determining whether said virtual buffer capacity will be exceeded if said current received block is compressed only by arithmetic coding, and if not, compressing said current received block with only arithmetic coding;
   (d) if said current received block cannot be compressed with said shortcuts and if said virtual buffer capacity would be exceeded with only arithmetic coding, determining whether said virtual buffer capacity will be exceeded if said current received block is compressed with both downsampling and arithmetic coding, and if not, compressing said current received block with both said downsampling and said arithmetic coding; and
   (e) if said current received block cannot be compressed with said shortcuts and if said virtual buffer capacity would be exceeded with only arithmetic coding or with both downsampling and arithmetic coding, compressing said current received block with a default mode of compression even if said virtual buffer capacity is exceeded with such compression.

12. The method of claim 11, wherein said digital video compression system is an MPEG-4 compliant shape code, said one or more blocks of digital information are binary alpha blocks, said current received block is a current binary alpha block, and said at least one identifiable characteristic is binary shape.

13. The method of claim 12, wherein said one or more shortcuts comprise a lossless compression mode representing an entirely white binary alpha block, a lossless compression mode representing an entirely black binary alpha block, and a lossless compression mode representing no change in an binary alpha block.

14. The method of claim 12, wherein said arithmetic coding comprises content-based arithmetic encoding.

15. The method of claim 14, wherein said step of content-based arithmetic encoding comprises the step of selecting between intra-coding of said binary alpha block, inter-coding of said binary alpha block, intra-coding of a transpose of said binary alpha block, and inter-coding of a transpose of said binary alpha block.

16. The method of claim 15, wherein said selecting step comprises choosing the content-based arithmetic encoding yielding the fewest bits.

17. The method of claim 12, wherein downsampling is size compression at a ratio of 1:2, and said step of compressing said current received block with both said downsampling and arithmetic coding comprises size compressing said current binary alpha block to ½ it original size and then selecting between intra-coding of said size compressed binary alpha block, inter-coding of said size compressed binary alpha block, intra-coding of a transpose of said size compressed binary alpha block, and inter-coding of a transpose of said size compressed binary alpha block.

18. eThe method of claim 17, further comprising the step of determining, if said current binary alpha block cannot be compressed with said shortcuts and if said virtual buffer capacity would be exceeded with either only arithmetic coding or with both size compression at a ratio of 1:2 and with arithmetic coding, size compressing said current binary alpha block to ¼ it original size and then selecting between intra-coding of said size compressed binary alpha block, inter-coding of said size compressed binary alpha block, intra-coding of a transpose of said size compressed binary alpha block, and inter-coding of a transpose of said size compressed binary alpha block.

19. The method of claim 18, wherein said default mode of compression comprises size compressing said current binary alpha block to ¼ it original size and then selecting, from intra-coding of said size compressed binary alpha block, inter-coding of said size compressed binary alpha block, intra-coding of a transpose of said size compressed binary alpha block, and inter-coding of a transpose of said size compressed binary alpha block, the lossless compression mode yielding the fewest bits.

20. A method for compressing digital video information by downsampling and arithmetic encoding while controlling the generated bit rate of compressed video information to keep within a maximum buffer capacity, comprising the steps of:
   (a) receiving one or more blocks of digital information, each block representing at least one identifiable characteristic for a portion of a frame of video;
   (b) determining whether a current received block can be compressed by one of one or more shortcuts, and if so, compressing said current received block with one of said shortcuts;
   (c) if said current received block cannot be compressed with said shortcuts, determining a measure of distortion if said current received block is only arithmetic encoded or first downsampled and then arithmetic encoded and (1) compressing said current received block by first downsampling and then arithmetic encoding if such encoding yields acceptable distortion and if said maximum buffer capacity is not exceeded;

(2) if downsampling and then arithmetic encoding does not yield acceptable distortion, compressing said current received block with only arithmetic encoding if said maximum buffer capacity is not exceeded; and (3) if said maximum buffer capacity is exceeded, recompressing a previous block in order to reduce buffer occupancy.

* * * * *

UNITED STATES PATENT AND TRADEMARK OFFICE
CERTIFICATE OF CORRECTION

PATENT NO. : 6,081,554
DATED : June 27, 2000
INVENTOR(S) : Lee et al.

It is certified that error appears in the above-identified patent and that said Letters Patent is hereby corrected as shown below:

[56] References Cited, OTHER PUBLICATIONS: Under ITV Standardisation...etc., "Communciation" should read -- Communication --;

[56] References Cited, OTHER PUBLICATIONS: Under Optimal Trellis-Based...etc., "Transations" should read -- Transactions --;

[57] ABSTRACT, line 6: "information," should read -- information; --;

In the Claims:

Column 17, line 47: "acteristicfor" should read -- acteristic for --;
Column 18, line 44: "arc" should read -- are --;
Column 18, line 54: "an" should read -- a --;
Column 19, line 3: "it" should read -- its --;
Column 19, line 15: "it" should read -- its --;
Column 19, line 23: "it" should read -- its --;
Column 20, line 8: "an" should read -- a --;
Column 20, line 23: "it" should read -- its --;
Column 20, line 29: "eThe" should read -- The --;
Column 20, line 30: "determining," should read -- determining --;
Column 20, line 35: "it" should read -- its --;
Column 20, line 43: "it" should read -- its --;

Column 1, line 50: "have" should read -- has --;
Column 2, line 3: "compressiontechniques" should read -- compression techniques --;

UNITED STATES PATENT AND TRADEMARK OFFICE
CERTIFICATE OF CORRECTION

PATENT NO. : 6,081,554
DATED : June 27, 2000
INVENTOR(S) : Lee et al.

It is certified that error appears in the above-identified patent and that said Letters Patent is hereby corrected as shown below:

Column 3, formula (4): "(A+C+D)" should read -- (B+A+D) --;
Column 3, formula (5): "(A+C+D)" should read -- (B+C+A) --;
Column 3, line 57: "interCAL" should read -- interCAE --;
Column 3, line 58: "VOP's" should read -- VOPs --;
Column 3, line 59: "ntra-CAE" should read -- intra-CAE --;
Column 3, line 65: "valeus" should read -- values --;
Column 4, line 2: "show." should read -- shown. --;
Column 4, line 29: "bistream" should read -- bitstream --;
Column 4, line 55: "stay" should read -- stays --;
Column 5, line 20: "an" should read -- a --;
Column 5, line 29: "it" should read -- its --;
Column 5, line 38: "it" should read -- its --;
Column 5, line 44: "it" should read -- its --;
Column 6, line 11: "illustrativedrawingrelatinga" should read -- illustrative drawing relating a --; and "virtualbufferto" should read -- virtual buffer to --;
Column 6, line 21: "were" should read -- where --;
Column 6, line 23: "were" should read -- where --;
Column 6, line 27: "MPFG-4" should read -- MPEG-4 --;
Column 6, line 33: "bistream" should read -- bitstream --;
Column 6, line 45: "Approximatios," should read -- Approximations, --;
Column 7, line 17: "mappingx" should read -- mapping x --;
Column 7, line 45: "precesses" should read -- processes --;
Column 7, line 59: "macrblocks" should read -- macroblocks --;
Column 8, line 66: "numnber" should read -- number --;
Column 9, line 31: "modes" should read -- mode --; and "steps" should read -- step --;

UNITED STATES PATENT AND TRADEMARK OFFICE
CERTIFICATE OF CORRECTION

PATENT NO. : 6,081,554
DATED : June 27, 2000
INVENTOR(S) : Lee et al.

It is certified that error appears in the above-identified patent and that said Letters Patent is hereby corrected as shown below:

Column 9, line 32: "an" should read -- and --;
Column 9, line 33: "is" should read -- are --;
Column 9, line 48: "psudo-code" should read -- pseudo-code --;
Column 9, line 49: "mentingthe" should read -- menting the --;
Column 9, line 61: "$D_{intraCAE}$" (second occurrence) should read -- $D_{interCAE}$ --;
Column 9, line 63: "noisless" should read -- noiseless --;
Column 9, line 65: "$D_{intraCAE}$" (second occurrence) should read -- $D_{interCAE}$ --;
Column 9, line 66: "$_{traCAE}$" should read -- $_{terCAE}$ --;
Column 10, line 3: "inthe" should read -- in the --; and "bitstreamis" should read -- bitstream is --;
Column 10, line 16: "distortionthan" should read -- distortion than --;
Column 10, line 23: "ofthis" should read -- of this --;
Column 10, line 38: "$B_{intraCAE}$" should read -- $B_{interCAE}$ --;
Column 10, line 39: "currentbuffer" should read -- current buffer --;
Column 10, line 41: "$B_{intraCAE}$" (first occurrence) should read -- $B_{interCAE}$ --;
Column 10, line 42: "$B_{intraCAE}$" (first occurrence) should read -- $B_{interCAE}$ --;
Column 10, line 43: "$B_{intraCAE}$" (first and last occurrences) should read -- $B_{interCAE}$ --;
Column 10, line 44: "$B_{intraCAE}$" (second occurrence) should read -- $B_{interCAE}$ --;
Column 10, line 48: "the" should be deleted;
Column 10, line 51: "an" should read -- and --;
Column 10, line 60: "$B_{visual}$" (both occurrences) should read -- $B_{virtual}$ --;
Column 10, line 64: "$B_{visual}$" should read -- $B_{virtual}$ --;
Column 10, line 66: "$B_{visual}$" should read -- $B_{virtual}$ --;
Column 11, line 1: "$B_{visual}$" (both occurrences) should read -- $B_{virtual}$ --;
Column 11, line 3: "$B_{visual}$" should read -- $B_{virtual}$ --;
Column 11, line 6: "$B_{visual}$" should read -- $B_{virtual}$ --;
Column 11, line 26: "$B_{visual}$" should read -- $B_{virtual}$ --;
Column 11, line 38: "$B_{visual}$" should read -- $B_{virtual}$ --;
Column 11, line 45: "$B_{visual}$" should read -- $B_{virtual}$ --;
Column 11, line 49: "$B_{visual}$" should read -- $B_{virtual}$ --;
Column 11, line 51: "ompression" should read -- compression --;

UNITED STATES PATENT AND TRADEMARK OFFICE
CERTIFICATE OF CORRECTION

PATENT NO. : 6,081,554
DATED : June 27, 2000
INVENTOR(S) : Lee et al.

It is certified that error appears in the above-identified patent and that said Letters Patent is hereby corrected as shown below:

Column 11, line 54: "$B_{visual}$" should read -- $B_{virtual}$ --;
Column 11, line 56: "$B_{visual}$" should read -- $B_{virtual}$ --;
Column 12, line 1: "fn" should read -- In --;
Column 12, line 4: "psudo-code" should read -- pseudo-code --;
Column 12, line 9: "$B_{visual}$" should read -- $B_{virtual}$ --;
Column 12, line 12: "$B_{visual}$" should read -- $B_{virtual}$ --;
Column 12, line 14: "$B_{visual}$" should read -- $B_{virtual}$ --;
Column 12, line 17: "$B_{visual}$" should read -- $B_{virtual}$ --;
Column 12, line 20: "$B_{visual}$" should read -- $B_{virtual}$ --;
Column 12, line 23: "$B_{visual}$" should read -- $B_{virtual}$ --;
Column 12, line 29: "$B_{visual}$" should read -- $B_{virtual}$ --;
Column 12, line 31: "$B_{visual}$" should read -- $B_{virtual}$ --;
Column 12, line 33: "$B_{visual}$" should read -- $B_{virtual}$ --;
Column 12, line 38: "$B_{visual}$" should read -- $B_{virtual}$ --;
Column 12, line 40: "$B_{visual}$" should read -- $B_{virtual}$ --;
Column 12, line 42: "$B_{visual}$" should read -- $B_{virtual}$ --;

Signed and Sealed this

Twenty-fourth Day of April, 2001

Attest:

NICHOLAS P. GODICI

Attesting Officer    Acting Director of the United States Patent and Trademark Office